(12) United States Patent
Lv

(10) Patent No.: US 11,035,443 B2
(45) Date of Patent: Jun. 15, 2021

(54) FOOTREST LIFTING AND ANGLE ADJUSTING MECHANISM OF ELECTRICALLY POWERED WHEELCHAIR

(71) Applicant: ZHEJIANG LINIX MOTOR CO., LTD, Zhejiang (CN)

(72) Inventor: Kaituo Lv, Zhejiang (CN)

(73) Assignee: ZHEJIANG LINIX MOTOR CO., LTD., Dongyang (CN)

(\*) Notice: Subject to any disclaimer, the term of this patent is extended or adjusted under 35 U.S.C. 154(b) by 252 days.

(21) Appl. No.: 16/234,532

(22) Filed: Dec. 27, 2018

(65) Prior Publication Data

US 2020/0088277 A1  Mar. 19, 2020

(30) Foreign Application Priority Data

Sep. 19, 2018 (CN) .......................... 201811096021.2

(51) Int. Cl.
*A61G 5/12* (2006.01)
*F16H 25/20* (2006.01)
*A61G 5/04* (2013.01)

(52) U.S. Cl.
CPC .............. *F16H 25/20* (2013.01); *A61G 5/04* (2013.01); *A61G 5/128* (2016.11); *F16H 2025/204* (2013.01)

(58) Field of Classification Search
CPC ... F16H 25/20; F16H 2025/204; A61G 5/128; A61G 5/04; A47C 7/50; A47C 7/503; A47C 7/506; A47C 7/5068
See application file for complete search history.

(56) References Cited

U.S. PATENT DOCUMENTS

| | | | | |
|---|---|---|---|---|
| 3,282,605 A | * | 11/1966 | Nihlean | A61G 5/10 280/211 |
| 3,618,968 A | * | 11/1971 | Greer | A61G 5/1089 280/47.11 |
| 4,486,048 A | * | 12/1984 | Meyer | A61G 5/12 297/423.33 |
| 5,033,793 A | * | 7/1991 | Quintile | A61G 5/1054 297/423.33 |
| 5,328,247 A | * | 7/1994 | Lovins | A47C 7/506 297/423.3 |
| 5,711,580 A | * | 1/1998 | Barclay | A61G 5/12 297/423.33 |
| 6,517,160 B2 | * | 2/2003 | Marcantoni | A47C 7/506 297/423.36 |

(Continued)

*Primary Examiner* — Kevin Hurley
*Assistant Examiner* — Michael R Stabley
(74) *Attorney, Agent, or Firm* — Jiwen Chen; Jacobson Holman PLLC

(57) ABSTRACT

A pedal lifting and angle adjusting mechanism includes an upper fixing block, a first push rod and a second push rod. The upper fixing block is fixed to a front end of a wheelchair frame. The first push rod includes a first housing. The second push rod includes a second housing. Both an upper end of the second housing and the first housing are hinged and fixed to the upper fixing block. A first push tube of the first push rod is hinged and fixed to a part deviating from the upper end of the second housing. A pedal is fixed to a second push tube of the second push rod. The first push rod is inclined. A hinged part of the first housing and the upper fixing block is located on a rear side of a hinged part of the first push tube and the second housing.

9 Claims, 4 Drawing Sheets

(56) References Cited

U.S. PATENT DOCUMENTS

| | | | | |
|---|---|---|---|---|
| 6,880,845 | B1* | 4/2005 | Broyles | A61G 5/12 |
| | | | | 280/250.1 |
| 6,976,699 | B2* | 12/2005 | Koerlin | A61G 5/006 |
| | | | | 280/304.1 |
| 7,360,840 | B2* | 4/2008 | Barlow | A61G 5/12 |
| | | | | 280/304.1 |
| 7,360,841 | B2* | 4/2008 | Barlow | A61G 5/12 |
| | | | | 280/304.1 |
| 8,186,695 | B2* | 5/2012 | Moller | A61G 5/107 |
| | | | | 280/47.4 |
| 8,187,156 | B2* | 5/2012 | Hochberg | A63B 23/03575 |
| | | | | 482/142 |

\* cited by examiner

FOOTREST LIFTING AND ANGLE ADJUSTING MECHANISM OF ELECTRICALLY POWERED WHEELCHAIR

CROSS REFERENCE TO RELATED APPLICATIONS

The present application claims the benefit of Chinese Patent Application No. 201811096021.2 filed on Sep. 19, 2018, the contents of which are incorporated herein by reference in its entirety.

TECHNICAL FIELD

The present invention relates to a footrest lifting and angle adjusting mechanism of an electrically powered wheelchair.

BACKGROUND ART

Footrests used for supporting feet are fixed to front ends of electrically powered wheelchairs, but most of the footrests of the existing electrically powered wheelchairs are fixed and non-movable, so it is difficult for users to sit or lie more comfortably. Moreover, due to the difference in leg length, the application range of the electrically powered wheelchairs with the fixed and non-movable footrests is narrower.

SUMMARY OF THE INVENTION

An object of the present invention is to provide a footrest lifting and angle adjusting mechanism of an electrically powered wheelchair, capable of adjusting a footrest position to improve use comfort.

To achieve the foregoing object, the present invention adopts the following technical solution: a footrest lifting and angle adjusting mechanism of an electrically powered wheelchair includes an upper fixing block, a first push rod and a second push rod; the upper fixing block is fixed to a front end of a wheelchair frame; the first push rod includes a first housing; the second push rod includes a second housing; both an upper end of the second housing and the first housing are hinged and fixed to the upper fixing block; the second housing is located on a front side of the first housing; a first push tube of the first push rod is hinged and fixed to a part deviating from the upper end of the second housing; a footrest is fixed to a second push tube of the second push rod; the first push rod is inclined; a hinged part of the first housing and the upper fixing block is located on a rear side of a hinged part of the first push tube and the second housing; the first push tube of the first push rod stretches to make the second push rod drive the footrest to overturn up and down by centering on the upper end of the second housing; and the second push tube of the second push rod stretches to make a distance between the footrest and the upper fixing block lengthened or shortened.

When the wheelchair of the present invention is used, the footrest is overturned in front-back and up-down directions by the first push rod, and a distance between the footrest and the wheelchair frame can be adjusted by the second push rod, so that the wheelchair meets requirements of users for various sitting postures or even lying postures, thereby improving the use comfort of the users.

Preferably, a driving motor, a screw rod, a nut and a guide tube are disposed in the second housing, one end of the second push tube is fixed to the nut while the other end of the second push tube extends out of the second housing, a protection cover is disposed outside the second push rod, multiple first guide grooves are formed on a tube wall of the guide tube along an axis of the guide tube, the nut includes a nut body sleeving the screw rod, a nut fixing block located outside the guide tube, and a nut connecting block connecting the nut fixing block and the nut body, the nut connecting block is fitted in the first guide groove, the nut fixing block is fixed to the protection cover, and the nut moves along the screw rod to drive the protection cover to move along the screw rod.

In order to prevent trousers of a user from being rolled into the second push rod, the protection cover is provided in the present invention, the second push rod is covered by the protection cover, and the protection cover is movable along with the movement of the footrest, so the present invention is higher in safety.

Preferably, the protection cover includes a face cover and two opposite fixing columns, left and right sides of the nut body are provided with the nut fixing block separately, left and right side walls of the guide tube are provided with the first guide groove separately, and the face cover is fixed between the two fixing columns. The foregoing arrangement prevents the protection cover from swinging from side to side, thereby improving the stability of the present invention.

Preferably, a nut positioning block is disposed on the nut connecting block, and the tube wall of the guide tube is limited between the nut positioning block and the nut fixing block. The foregoing arrangement further prevents the protection cover from swinging, so as to more stabilize the structure of the present invention.

Preferably, a guide protrusion and a second guide groove which are mutually fitted are formed between an inner wall of the nut fixing block and an outer wall of the guide tube. According to the present invention, the guide protrusion or the second guide groove is provided on the outer wall of the guide tube, so that the guide tube is easier to process, and furthermore, the nut of the present invention is more convenient for guide movement.

Preferably, multiple inner protrusions are disposed on the inner wall of the nut fixing block, outer edges of the inner protrusions are arc-shaped along a radial section of the screw rod, and arc-shaped surfaces of the inner protrusions are in contact with the outer wall of the guide tube. The foregoing arrangement reduces a contact area between the nut and the guide tube, reduces a force of friction between the nut and the guide tube, and makes it more convenient to assemble the guide tube and the nut.

Preferably, multiple elastic members are disposed between the nut connecting block and the inner wall of the guide tube, the elastic member includes an elastic member housing, a steel ball and a spring, the elastic member housing of the elastic member is fixed to the nut connecting block, and the steel ball of the elastic member urges against the inner wall of the guide tube under the action of the spring. The foregoing arrangement stabilizes the nut to prevent the nut from swinging. The elastic member is fixed to the nut, the nut may be directly injection-molded, processing is facilitated, and the production cost is reduced.

Preferably, the guide tube is composed of a front half tube and a rear half tube, two axial ends of the guide tube are provided with an upper fixing seat and a lower cover plate respectively, the front half tube and the rear half tube are fixed between the upper fixing seat and the lower cover plate through fasteners, and the first guide groove is formed between the front half tube and the rear half tube. The foregoing arrangement makes the guide tube of the present invention more conveniently manufactured, and makes the guide tube and the nut more conveniently assembled, so as to reduce the production cost of the wheelchair of the present invention.

Preferably, the nut fixing block includes a left nut fixing block on a left side of the guide tube, a right nut fixing block on a right side of the guide tube, and a front nut fixing block on a front side of the guide tube. The left nut fixing block, the right nut fixing block and the front nut fixing block are connected to form a U-shaped structure, the left nut fixing block and the right nut fixing block are fixed to one fixing column separately, and the face cover is fixed to a front side of the front nut fixing block. The foregoing arrangement stabilizes movement of the nut and the protection cover of the present invention.

Preferably, the upper end of the first housing is hinged and fixed to the upper fixing block to form a first hinged part, the upper end of the second housing is hinged and fixed to the upper fixing block to form a second hinged part, a height position of the second hinged part is higher than that of the first hinged part, a lower end of the first push tube of the first push rod is hinged and fixed to the second housing to form a third hinged part, a maximum stroke length of the first push rod is La, a front-back distance between the first hinged part and the second hinged part is Lb, a height distance between the first hinged part and the second hinged part is Lc, when the second push tube of the second push rod is vertical, a front-back distance between the third hinged part and the second hinged part is Ld, and a height distance between the second hinged part and the third hinged part is Le, where $(Lb-Ld)^2+(Lc+Le)^2=La^2$. The foregoing arrangement makes the second push rod of the present invention overturn forward and upward to be horizontal, so as to expand the application range of the wheelchair of the present invention.

The present invention has the advantages that the footrest position is adjustable and the wheelchair is applicable to a wider range. Furthermore, the structure of the present invention is safer and more stable.

DETAILED DESCRIPTION OF THE INVENTION

Figure 1:
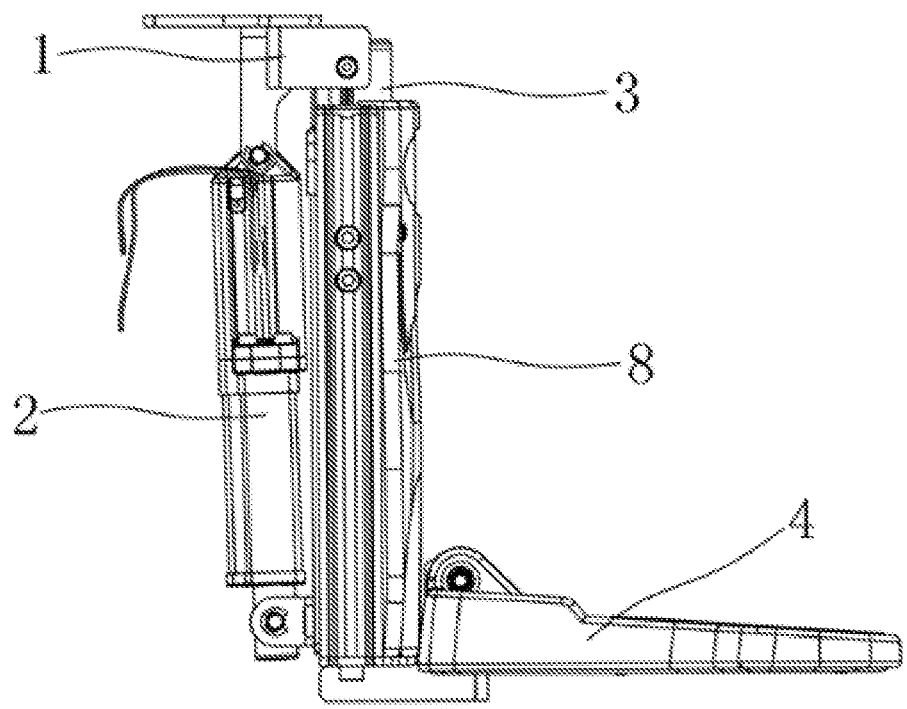
FIG. 1 is a use state diagram of the present invention.

The present invention is further described hereinafter according to the drawings and specific embodiments.

As shown in FIG. 1 to FIG. 4, a footrest lifting and angle adjusting mechanism of an electrically powered wheelchair of the present invention includes an upper fixing block 1, a first push rod 2 and a second push rod 3. The upper fixing block 1 is fixed to a front end of a wheelchair frame. The first push rod 2 includes a first housing 21. The second push rod 3 includes a second housing 31. Both an upper end of the second housing 31 and an upper end of the first housing 21 are hinged and fixed to the upper fixing block 1. The second housing 31 is located on a front side of the first housing 21. A first push tube 22 of the first push rod 2 is hinged and fixed to a lower end of the second housing 31. A footrest 4 is fixed to a second push tube 32 of the second push rod 3. The first push rod 2 is inclined. A hinged part of the first housing 21 and the upper fixing block 1 is located on a rear side of a hinged part of the first push tube 22 and the second housing 31. The first push tube 22 of the first push rod 2 stretches to make the second push rod 3 drive the footrest 4 to overturn up and down by centering on the upper end of the second housing 31. The second push tube 32 of the second push rod 3 stretches to make a distance between the footrest 4 and the upper fixing block 1 lengthened or shortened.

The upper end of the first housing 21 is hinged and fixed to the upper fixing block 1 to form a first hinged part 11, the upper end of the second housing 31 is hinged and fixed to the upper fixing block 1 to form a second hinged part 12, a height position of the second hinged part 12 is higher than that of the first hinged part 11, a lower end of the first push tube 22 of the first push rod 2 is hinged and fixed to the second housing 31 to form a third hinged part 13, a maximum stroke length of the first push rod 2 is La, a front-back distance between the first hinged part 11 and the second hinged part 12 is Lb, a height distance between the first hinged part 11 and the second hinged part 12 is Lc, when the second push tube 32 of the second push rod 3 is vertical, a front-back distance between the third hinged part 13 and the second hinged part 12 is Ld, and a height distance between the second hinged part 12 and the third hinged part 13 is Le, where $(Lb-Ld)^2+(Lc+Le)^2=La^2$.

As shown in FIG. 5 to FIG. 8, a driving motor, a screw rod 5, a nut 6 and a guide tube 7 are disposed in the second housing 31, one end of the second push tube 32 is fixed to the nut 6 while the other end of the second push tube 32 extends out of the second housing 31, a protection cover 8 is disposed outside the second push rod 3, multiple first guide grooves 70 are formed on a tube wall of the guide tube 7 along an axis of the guide tube 7, the nut 6 includes a nut body 61 sleeving the screw rod 5, a nut fixing block 62 located outside the guide tube 7, and a nut connecting block 63 connecting the nut fixing block 62 and the nut body 61, the nut connecting block 63 is fitted in the first guide groove 70, the nut fixing block 62 is fixed to the protection cover 8, and the nut 6 moves along the screw rod to drive the protection cover 8 to move along the screw rod 5.

Figure 2:
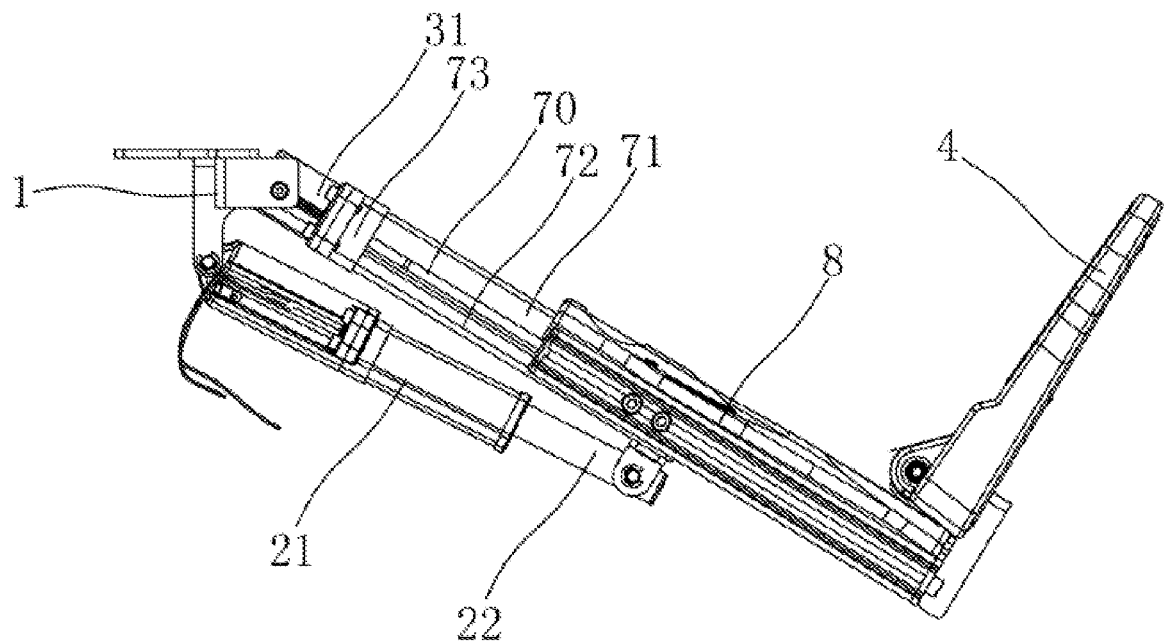
FIG. 2 is another use state diagram of the present invention.
Figure 3:
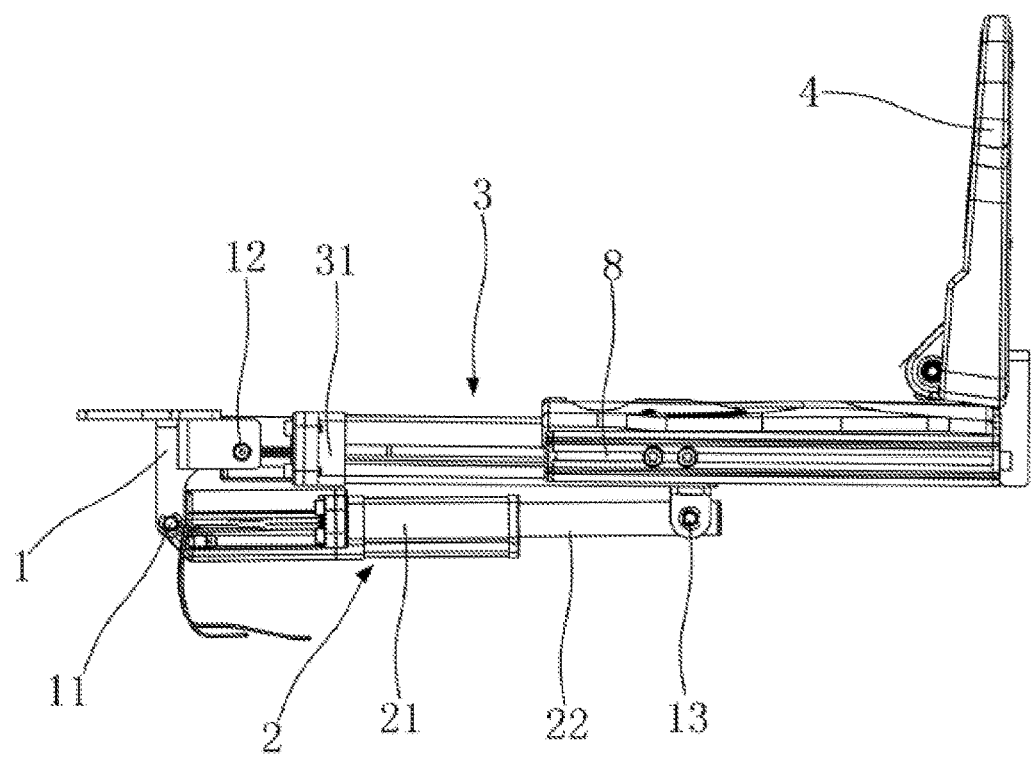
FIG. 3 is yet another use state diagram of the present invention.
Figure 4:
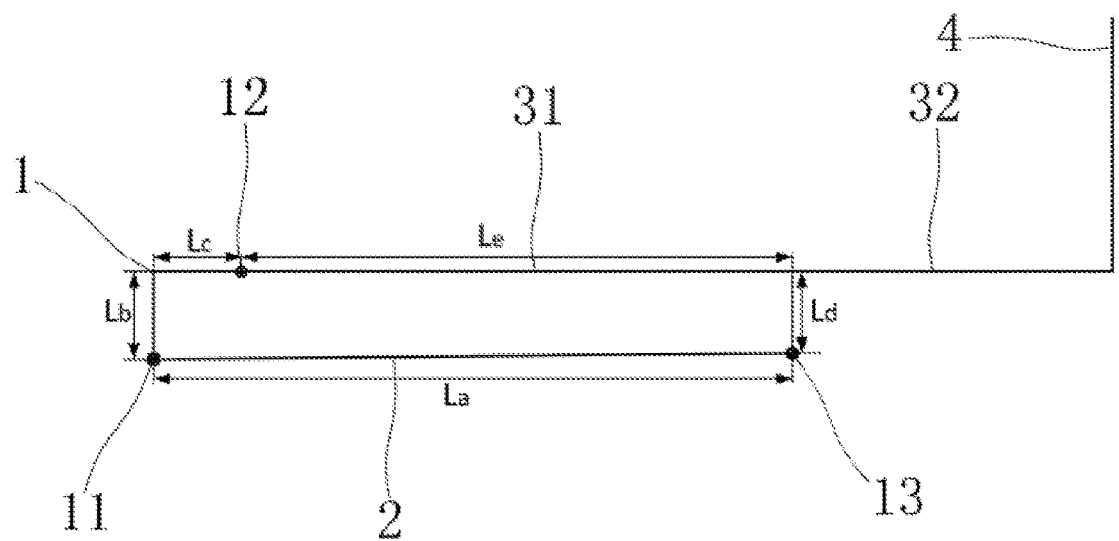
FIG. 4 is a structure schematic diagram of a second push rod in a horizontal state according to the present invention.
Figure 8:
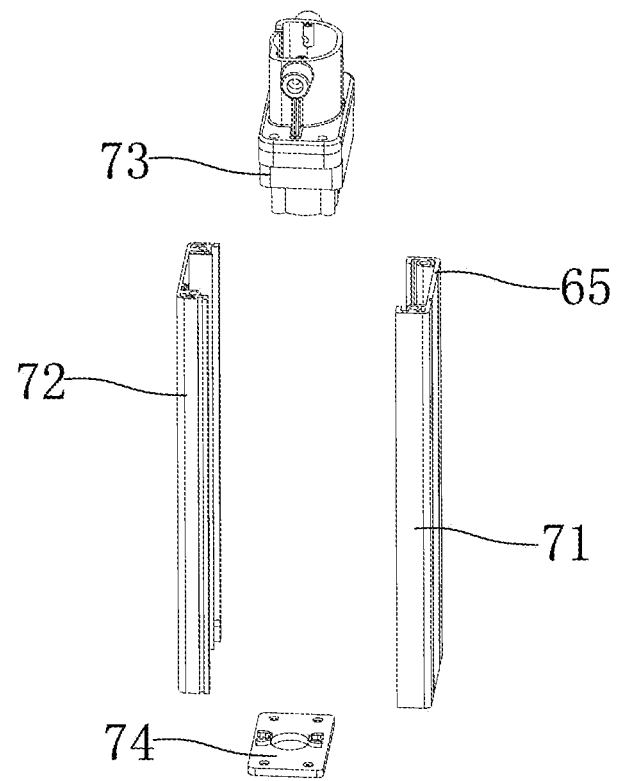
FIG. 8 is a structure schematic diagram of a guide tube according to the present invention.

As shown in FIG. 2 and FIG. 8, the guide tube 7 is composed of a front half tube 71 and a rear half tube 72, two axial ends of the guide tube 7 are provided with an upper fixing seat 73 and a lower cover plate 74 respectively, the front half tube 71 and the rear half tube 72 are fixed between the upper fixing seat 73 and the lower cover plate 74 through fasteners, and a certain distance exists between the front half tube 71 and the rear half tube 72 to form the first guide groove 70.

Figure 5:
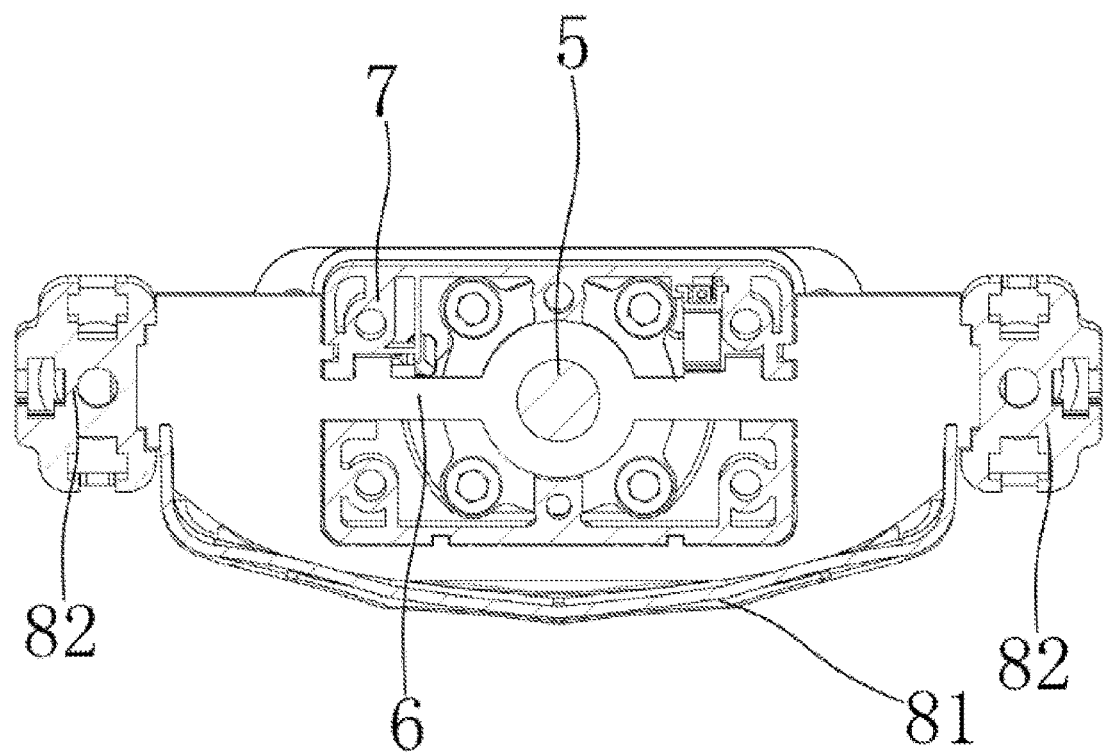
FIG. 5 is a sectional view of the present invention.
Figure 6:
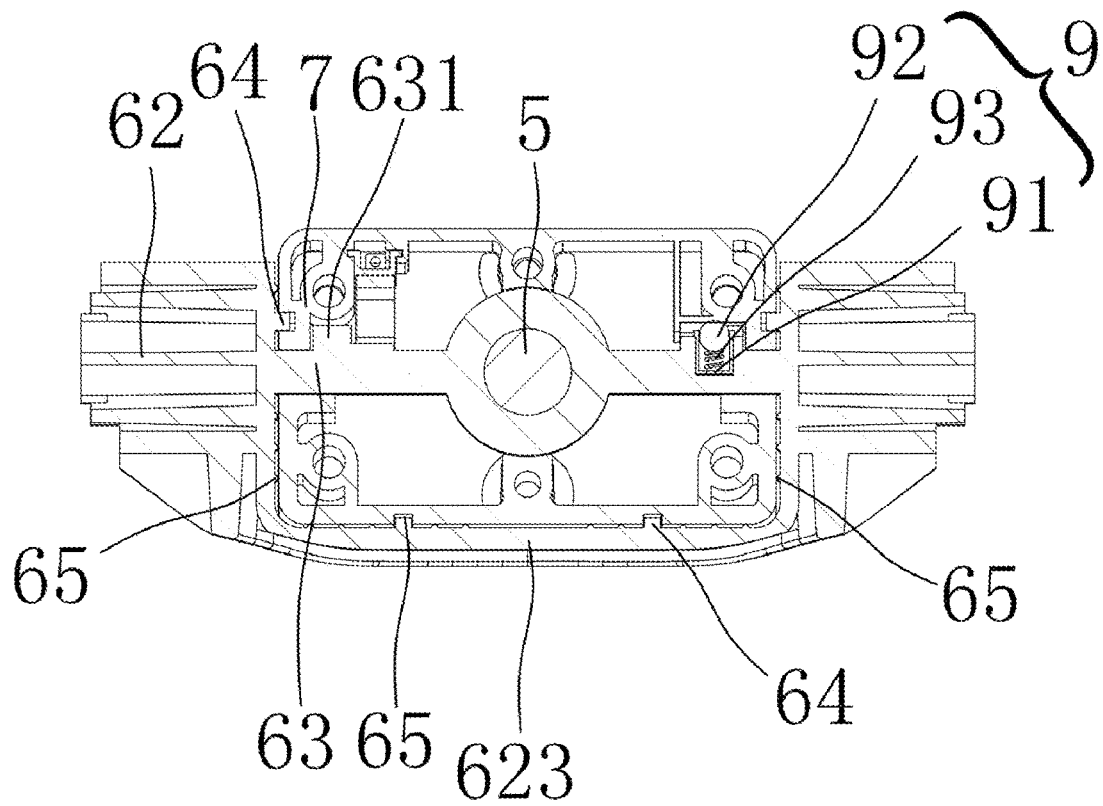
FIG. 6 is another sectional view of the present invention.
Figure 7:
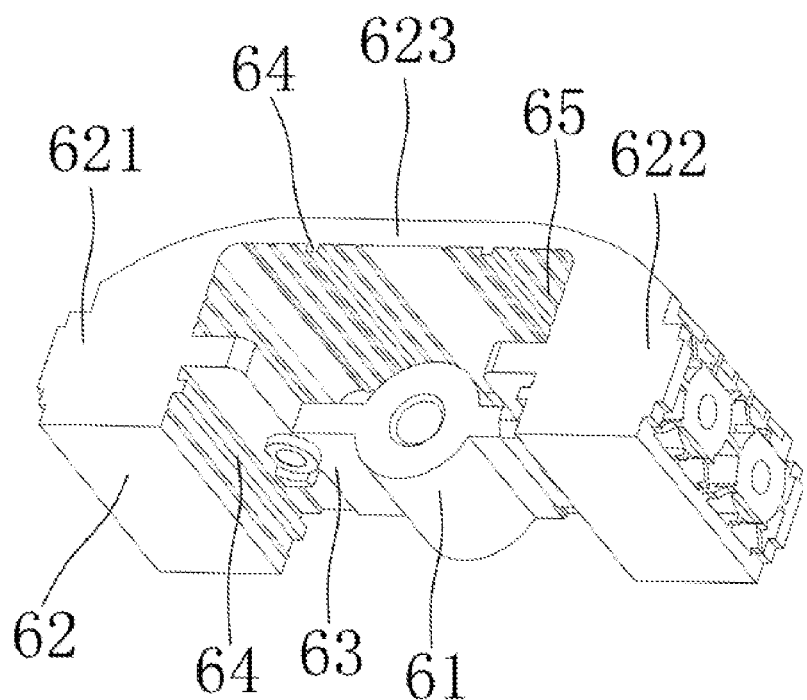
FIG. 7 is a structure schematic diagram of a nut according to the present invention.

As shown in FIG. 5 to FIG. 7, the protection cover 8 includes a face cover 81 and two opposite fixing columns 82, left and right sides of the nut body 61 are provided with the nut fixing block 62 separately, left and right side walls of the guide tube 7 are provided with the first guide groove 70 separately, and the face cover 81 is fixed between the two fixing columns 82. The nut fixing block 62 includes a left nut fixing block 621 on a left side of the guide tube 7, a right nut fixing block 622 on a right side of the guide tube 7, and a front nut fixing block 623 on a front side of the guide tube 7. The left nut fixing block 621, the right nut fixing block 622 and the front nut fixing block 623 are integrally formed to compose a U-shaped structure, the left nut fixing block 621 and the right nut fixing block 622 are fixed to one fixing column through a fastener separately, and the face cover 81 is fixed to a front side of the front nut fixing block 623 through a fastener.

As shown in FIG. 5 to FIG. 7, a nut positioning block 631 is disposed on the nut connecting block 63, and the tube wall of the guide tube 7 is limited between the nut positioning block 631 and the nut fixing block 62. A guide protrusion 64 and a second guide groove 75 which are mutually fitted are formed between an inner wall of the nut fixing block 62 and an outer wall of the guide tube 7. Multiple inner protrusions 65 are disposed on the inner wall of the nut fixing block 62, outer edges of the inner protrusions 65 are arc-shaped along a radial section of the screw rod 5, and arc-shaped surfaces of the inner protrusions 65 are in contact with the outer wall of the guide tube 7. Multiple elastic members 9 are disposed between the nut connecting block 63 and the inner wall of the guide tube 7, the elastic member 9 includes an elastic member housing 91, a steel ball 92 and a spring 93, the elastic member housing 91 of the elastic member 9 is fixed to the nut connecting block 63, and the steel ball 92 of the elastic member 9 urges against the inner wall of the guide tube 7 under the action of the spring 93.

When the wheelchair of the present invention is used, the footrest is overturned in front-back and up-down directions by the first push rod, a distance between the footrest and the wheelchair frame can be adjusted by the second push rod, and the second push rod of the present invention can be rotated to a horizontal position under the action of the first push rod, so that the wheelchair meets requirements of users on various sitting postures or even lying postures, thereby improving the use comfort of the users. The present invention has the advantages that the footrest position is adjustable and the wheelchair is applicable to a wider range. Furthermore, the structure of the present invention is safer and more stable.

What is claimed is:

1. A footrest lifting and angle adjusting mechanism of an electrically powered wheelchair, characterized by comprising an upper fixing block, a first push rod and a second push rod, wherein the upper fixing block is fixed to a front end of a wheelchair frame; the first push rod comprises a first housing; the second push rod comprises a second housing; both an upper end of the second housing and the first housing are hinged and fixed to the upper fixing block; the second housing is located on a front side of the first housing; a first push tube of the first push rod is hinged and fixed to a part deviating from the upper end of the second housing; a footrest is fixed to a second push tube of the second push rod; the first push rod is inclined; a hinged part of the first housing and the upper fixing block is located on a rear side of a hinged part of the first push tube and the second housing; the first push tube of the first push rod stretches to make the second push rod drive the footrest to overturn up and down by centering on the upper end of the second housing; and the second push tube of the second push rod stretches to make a distance between the footrest and the upper fixing block lengthened or shortened, and characterized in that a driving motor, a screw rod, a nut and a guide tube are disposed in the second housing, one end of the second push tube is fixed to the nut while the other end of the second push tube extends out of the second housing, a protection cover is disposed outside the second push rod, multiple first guide grooves are formed on a tube wall of the guide tube along an axis of the guide tube, the nut comprises a nut body sleeving the screw rod, a nut fixing block located outside the guide tube, and a nut connecting block connecting the nut fixing block and the nut body, the nut connecting block is fitted in the first guide groove, the nut fixing block is fixed to the protection cover, and the nut moves along the screw rod to drive the protection cover to move along the screw rod.

2. The footrest lifting and angle adjusting mechanism of an electrically powered wheelchair according to claim 1, characterized in that the protection cover comprises a face cover and two opposite fixing columns, left and right sides of the nut body are provided with the nut fixing block separately, left and right side walls of the guide tube are provided with the first guide groove separately, and the face cover is fixed between the two fixing columns.

3. The footrest lifting and angle adjusting mechanism of an electrically powered wheelchair according to claim 2, characterized in that the guide tube is composed of a front half tube and a rear half tube, two axial ends of the guide tube are provided with an upper fixing seat and a lower cover plate respectively, the front half tube and the rear half tube are fixed between the upper fixing seat and the lower cover plate through fasteners, and the first guide groove is formed between the front half tube and the rear half tube.

4. The footrest lifting and angle adjusting mechanism of an electrically powered wheelchair according to claim 2, characterized in that the nut fixing block comprises a left nut fixing block on a left side of the guide tube, a right nut fixing block on a right side of the guide tube, and a front nut fixing block on a front side of the guide tube, wherein the left nut fixing block, the right nut fixing block and the front nut fixing block are connected to form a U-shaped structure, the left nut fixing block and the right nut fixing block are fixed to one fixing column separately, and the face cover is fixed to a front side of the front nut fixing block.

5. The footrest lifting and angle adjusting mechanism of an electrically powered wheelchair according to claim 1, characterized in that a nut positioning block is disposed on the nut connecting block, and the tube wall of the guide tube is limited between the nut positioning block and the nut fixing block.

6. The footrest lifting and angle adjusting mechanism of an electrically powered wheelchair according to claim 1, characterized in that a guide protrusion and a second guide groove which are mutually fitted are formed between an inner wall of the nut fixing block and an outer wall of the guide tube.

7. The footrest lifting and angle adjusting mechanism of an electrically powered wheelchair according to claim 1, characterized in that multiple inner protrusions are disposed on the inner wall of the nut fixing block, outer edges of the inner protrusions are arc-shaped along a radial section of the screw rod, and arc-shaped surfaces of the inner protrusions are in contact with the outer wall of the guide tube.

8. The footrest lifting and angle adjusting mechanism of an electrically powered wheelchair according to claim 1, characterized in that multiple elastic members are disposed between the nut connecting block and the inner wall of the guide tube, the elastic member comprises an elastic member housing, a steel ball and a spring, the elastic member housing of the elastic member is fixed to the nut connecting block, and the steel ball of the elastic member urges against the inner wall of the guide tube under the action of the spring.

9. The footrest lifting and angle adjusting mechanism of an electrically powered wheelchair according to claim 1, characterized in that the upper end of the first housing is hinged and fixed to the upper fixing block to form a first hinged part, the upper end of the second housing is hinged and fixed to the upper fixing block to form a second hinged part, a height position of the second hinged part is higher than that of the first hinged part, a lower end of the first push tube of the first push rod is hinged and fixed to the second housing to form a third hinged part, a maximum stroke length of the first push rod is La, a front-back distance between the first hinged part and the second hinged part is Lb, a height distance between the first hinged part and the second hinged part is Lc, when the second push tube of the second push rod is vertical, a front-back distance between the third hinged part and the second hinged part is Ld, and a height distance between the second hinged part and the third hinged part is Le, where $(Lb-Ld)^2+(Lc+Le)^2=La^2$.

* * * * *